United States Patent [19]

Jackson

[11] Patent Number: 4,978,490
[45] Date of Patent: Dec. 18, 1990

[54] FULL OVERLAYING INJECTION MOLDING
[75] Inventor: Norman C. Jackson, Livonia, Mich.
[73] Assignee: The Standard Products Company, Cleveland, Ohio
[21] Appl. No.: 243,418
[22] Filed: Sep. 12, 1988
[51] Int. Cl.$^5$ .................... B29C 45/14; B29C 47/04
[52] U.S. Cl. .................... 264/148; 264/263; 264/275; 264/294
[58] Field of Search ............ 264/246, 247, 250, 254, 264/255, 275, 278, DIG. 57, 263, 148, 294; 428/31

[56] References Cited

U.S. PATENT DOCUMENTS

| | | | |
|---|---|---|---|
| 2,290,249 | 7/1942 | Piperoux | 264/278 |
| 3,290,082 | 12/1966 | Fritsch | 293/128 |
| 3,359,030 | 12/1967 | Newman | 84/16 |
| 3,388,523 | 6/1968 | Evans | 293/128 |
| 3,398,921 | 8/1968 | Braun | 604/185 |
| 3,441,305 | 4/1969 | Trammell, Jr. | 293/128 |
| 3,451,709 | 6/1969 | Swauger | 293/128 |
| 3,506,294 | 4/1970 | Newman | 293/128 |
| 3,582,134 | 6/1971 | Shaff | 296/146 |
| 3,606,432 | 9/1971 | Honatzis | 293/128 |
| 3,843,475 | 10/1974 | Kent | 428/31 |
| 3,940,901 | 3/1976 | Nivet | 293/128 |
| 4,066,285 | 1/1978 | Hall et al. | 293/120 |
| 4,174,986 | 11/1979 | Jennings | 428/31 |
| 4,220,365 | 9/1980 | Foster et al. | 293/128 |
| 4,463,539 | 8/1984 | Simon | 428/31 |
| 4,498,697 | 2/1985 | McGlone et al. | 293/128 |
| 4,617,209 | 10/1986 | Ives | 428/31 |
| 4,778,550 | 10/1988 | Barton et al. | 428/31 |

Primary Examiner—James Lowe
Attorney, Agent, or Firm—Harness, Dickey & Pierce

[57] ABSTRACT

A trim molding for attachment to a vehicle includes a core member having an outer periphery less than a predetermined thickness. An end is formed at each end of the core member. An outer layer is molded about one side of the core member and ends to form a smooth continuous surface to the predetermined thickness and to prevent a joint line from visually appearing between the ends and the core member in the outer layer.

4 Claims, 1 Drawing Sheet

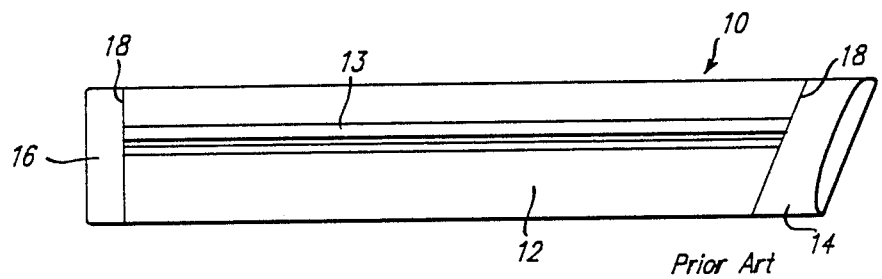
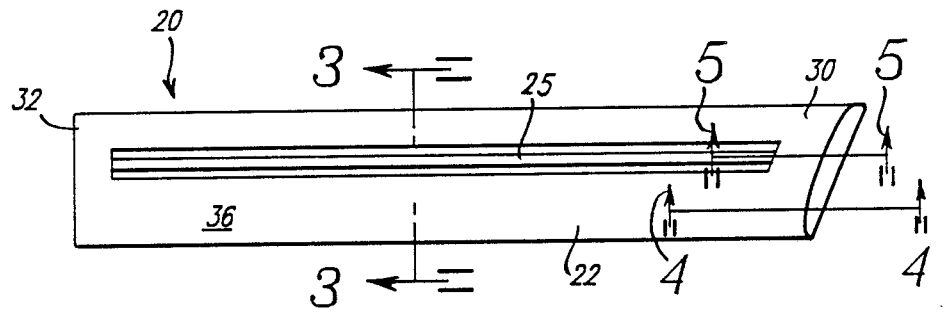
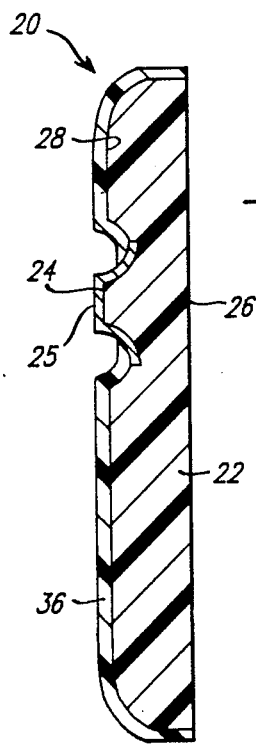
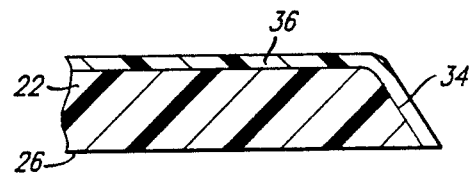
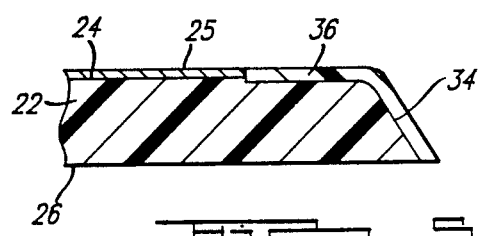

FULL OVERLAYING INJECTION MOLDING

BACKGROUND OF THE INVENTION

The present invention relates to a molding for attachment to a vehicle, and particularly, to a trim molding having an outer layer injection molded about a core member.

One conventional type of trim molding for attachment to automotive vehicles, e.g. as body side molding, has included a solid metal core. This type of molding was made by roll forming a flat strip of metal into a predetermined shape and then extruding a polymeric material about the core to form an outer skin thereon.

One disadvantage encountered during fabrication of such trim moldings related to imperfections in the outer skin due to vibrations set up in the metal during the extrusion step. The metal core would transmit vibrations which would result in imperfections in the outer skin. Ridges, or "chatter lines" would appear in the outer skin due to the vibrations.

Another disadvantage of such trim moldings having metal cores involves their end caps. End caps were generally attached or molded to the end of the metal core and outer skin extrusion. This arrangement, however, provided an unsightly joint line between the end cap and the molding.

Another conventional method of making trim moldings involves extruding a thermoplastic material (typically PVC) to the desired shape and then injection molding ends on the cut ends of the extrusion to give a finished appearance. However, this method also suffers the disadvantage of providing a joint line between the end of the extrusion and the molded end cap. It will be appreciated by those skilled in the art that this method of manufacture requires fine tolerances in order to obtain a satisfactory appearance of the joint. If the extrusion is larger or smaller than the end cap, the end of the extrusion and end cap will not mate precisely. This leaves an unsightly condition requiring costly hand trimming and the resulting appearance is undesirable.

It is an object of the present invention to provide an improved trim molding overcoming the aforementioned disadvantages. Further understanding of the present invention will be had from the following description taken in conjunction with the drawings and accompanying claims.

SUMMARY OF THE INVENTION

A trim molding for attachment to a vehicle includes a core member having an undersized outer periphery. A length of core member is selected and an outer layer is molded about the length of core member and the ends thereof to form a smooth outer layer having a predetermined desired outer periphery without any undesirable joint lines. Accordingly, the present invention eliminates chatter lines in the outer skin as occur when extruding over a metal core member. Also, the present invention avoids any visible joint line between end caps and core member.

BRIEF DESCRIPTION OF THE DRAWINGS

FIG. 1 is an elevational view of a prior art trim molding.

FIG. 2 is an elevational view of a preferred embodiment of the present invention.

FIG. 3 is a sectional view taken along line 3—3 of FIG. 2.

FIG. 4 is a sectional view, broken away, taken along line 4—4 in FIG. 2.

FIG. 5 is a sectional view, broken away, taken along line 5—5 in FIG. 2.

DESCRIPTION OF THE PREFERRED EMBODIMENT

A conventional prior art trim molding for attachment to a vehicle (not shown) is generally shown at 10 in FIG. 1. Trim molding 10 includes a metallic core member (not shown) which is a cut length of extrusion having thermoplastic layer 12 extruded thereon and presenting a bright area or strip 13 extending along the length thereof. The trim molding 10 has end caps 14 and 16 molded at opposite ends. Joint lines 18 appear where end caps 14 and 16 are molded to trim molding 10.

Now referring to FIGS. 2-5, a trim molding of the present invention for attachment to a vehicle (not shown) is generally indicated by the numeral 20. Trim molding 20 is suitable, for example, as body side molding to prevent damage by door strikes and the like. Trim molding 20 includes a thermoplastic core member 22. Core member 22 can comprise an inexpensive, even unsightly scrap material and can be foam or solid. Solid, non-weatherable polyvinylchloride is suitable material for core member 22. A bright strip 25 is secured to surface portion 24 of core member 22 which has a dimensional configuration or predetermined periphery somewhat less than that desired in the final product. It will be appreciated by those skilled in the art that bright strip 25 can be a conventional metallized film such as aluminum metallized polyester film and that, although not shown in the drawing, it is contemplated that a protective transparent layer can cover bright strip 25.

Core member 22 has end portions 30, 32 at each end thereof. In accordance with the present invention core member 22 is placed in a suitable mold and an outer skin or layer 36 of thermoplastic material is injection molded in a conventional manner over core member 22 to provide a desirable outer surface and to simultaneously provide end caps over ends 34. Outer layer 36 must be of suitable high quality material such as uv protected polyvinyl chloride, as it is exposed to sight and weather. The final outer periphery of molding has a predetermined thickness determined by the mold. The outer skin or layer 36 forms a smooth outer surface on the core member and portions 30 and a continuous surface therebetween and avoids ridges and joint lines between end caps and the core member. Undersurface 28 of outer layer 36 overlaps the lateral edges of bright strip 25 to protect bright strip 25 against deterioration due to the weather elements.

Molding 20 can be attached to a vehicle in any conventional manner as by use of 2-side adhesive tape applied to surface 26. Preferably 2-side adhesive tape is applied to surface 26 during extrusion of core member 22 and before molding outer layer 36 thereon.

The present invention also provides a method of making a trim molding. The method includes the steps of providing a core member 22 as by extruding and cutting a polymeric material to less than a predetermined thickness and length; then injection molding a thermoplastic material about one side of the core member 22 and the ends thereof to form a smooth continuous surface on the end portions thereof having a predetermined thickness and length without a joint line appearing between end caps and the core member.

The present invention having been described in an illustrative manner, it is to be understood that modifications and variations of the present invention are possible in light of the above disclosure. It is, therefore, to be understood that the invention is to be limited only by the scope of the appended claims.

What is claimed is:

1. A method of making a trim molding for attachment to a vehicle, said method comprising the steps of:
    forming an elongated core member by extruding and cutting a polymeric material to an outer periphery and length less than a predetermined thickness and length;
    forming an end at each end of the core member;
    molding an outer layer of a polymeric material about at least a portion of one side only of the core member and over said ends to form an outer elongated layer over the core member to the predetermined thickness and to provide a smooth continuous surface from one of said ends to the other of said ends to thereby prevent a transverse joint line from visually appearing in the outer elongated layer between the ends and the core member.

2. A method as set forth in claim 1 including the step of securing an elongated bright strip with lateral edge portions onto said core member and molding said outer elongated layer over only said lateral edge portions of said bright strip thereby leaving a central portion of said bright strip exposed to view.

3. A method as set forth in claim 2 wherein said step of molding the outer elongated layer is carried to by injection molding.

4. A method of making a trim molding for attachment to a vehicle, said method comprising the steps of:
    extruding a core member to an outer periphery less than a predetermined thickness said core member having a bright area;
    forming an end at each end of the core member;
    injection molding an outer layer about one side only of the core member to fill the space between the bright area and outer periphery of the core member to form a smooth continuous surface and to prevent a transverse joint line from appearing between the ends and the core member.

* * * * *